Aug. 26, 1941.    M. JENSEN    2,254,149
AUTOMOBILE JACK
Filed Sept. 28, 1940    3 Sheets-Sheet 1
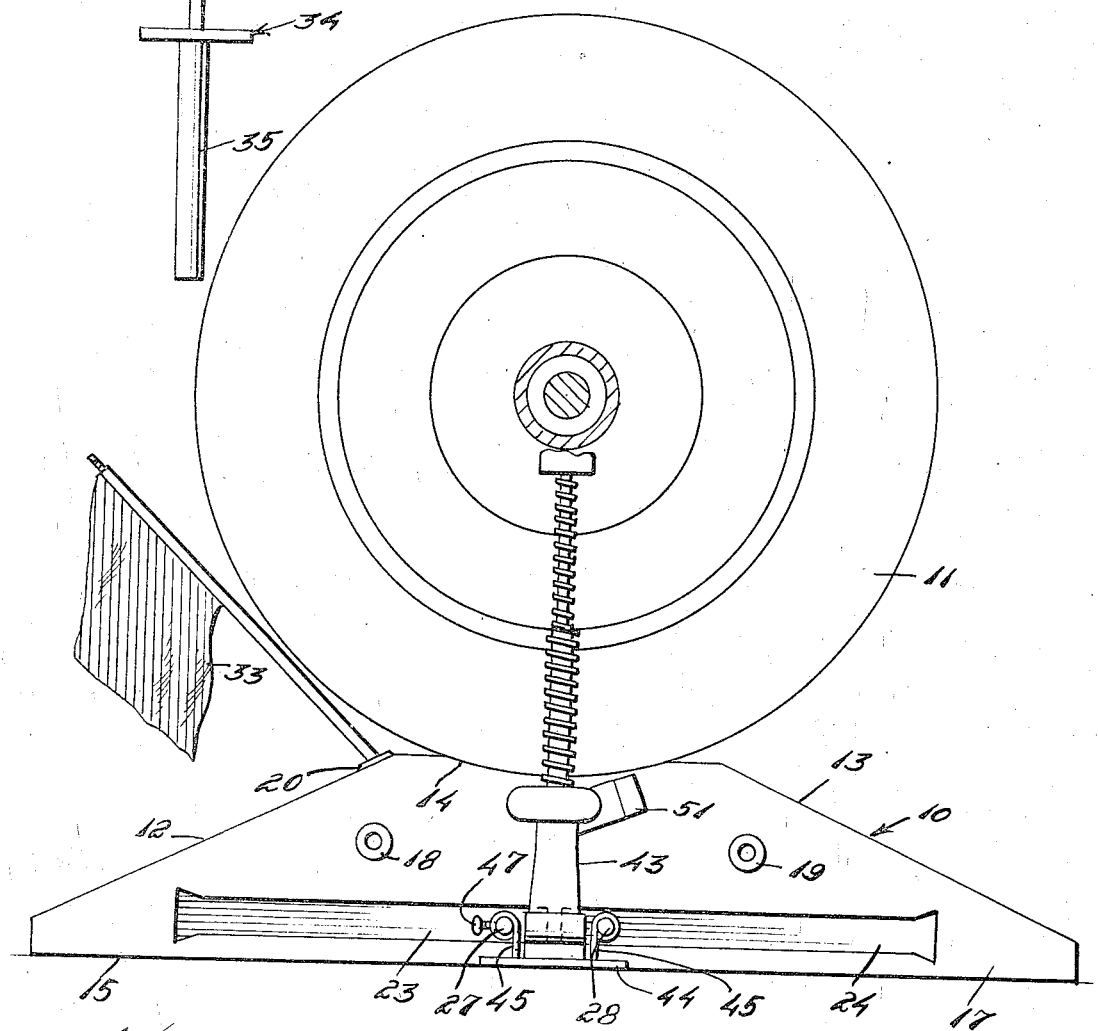
Inventor
Marthinus Jensen
By Clarence A. O'Brien
Attorney Aug. 26, 1941.   M. JENSEN   2,254,149
AUTOMOBILE JACK
Filed Sept. 28, 1940   3 Sheets-Sheet 2
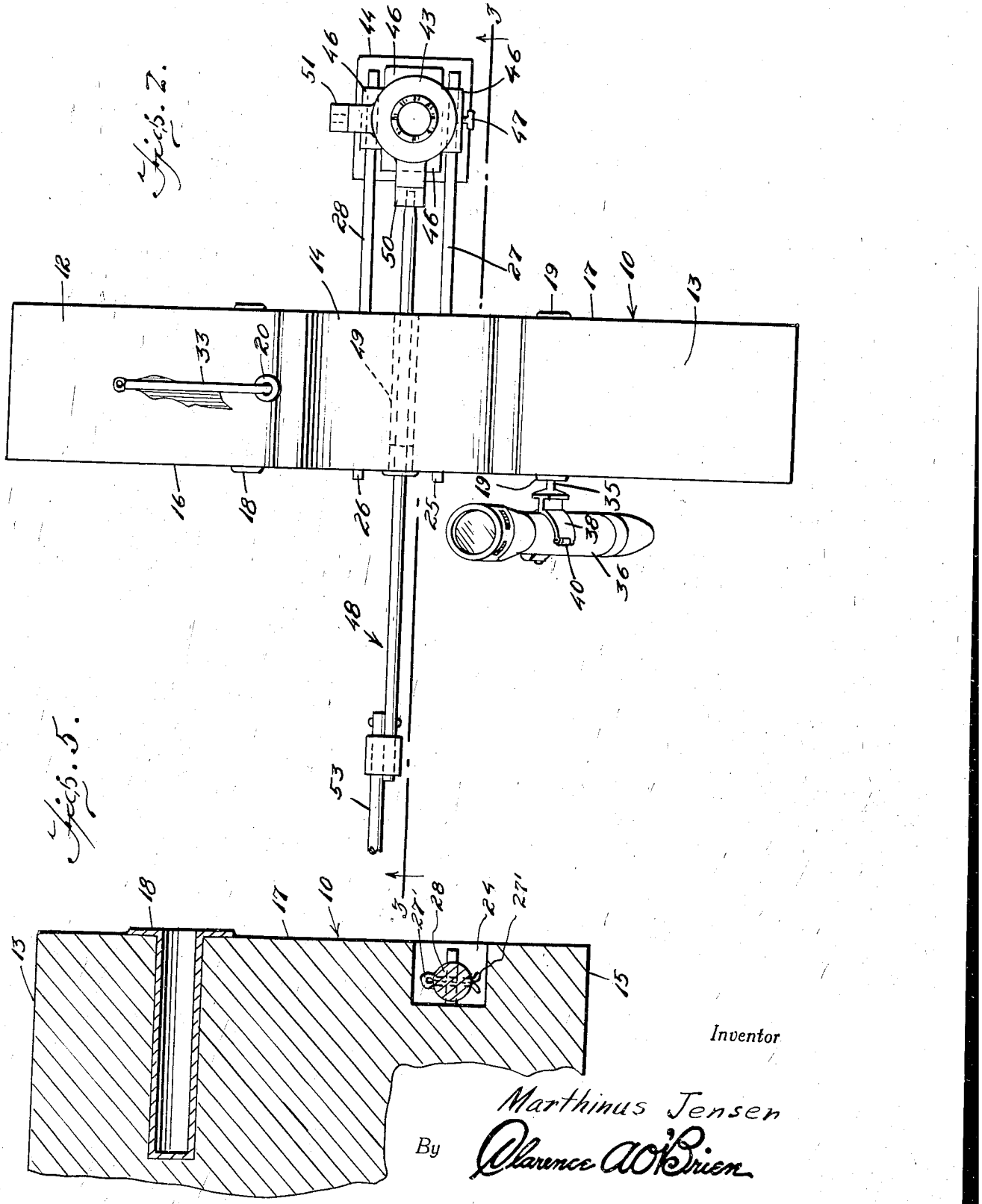
Inventor
Marthinus Jensen
By Clarence A. O'Brien
Attorney Aug. 26, 1941.    M. JENSEN    2,254,149
AUTOMOBILE JACK
Filed Sept. 28, 1940    3 Sheets-Sheet 3
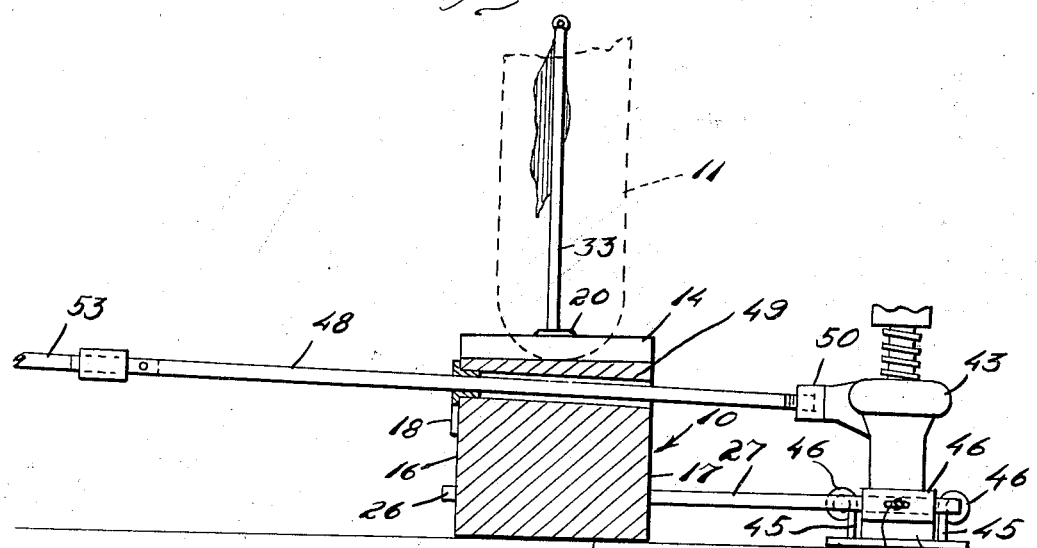
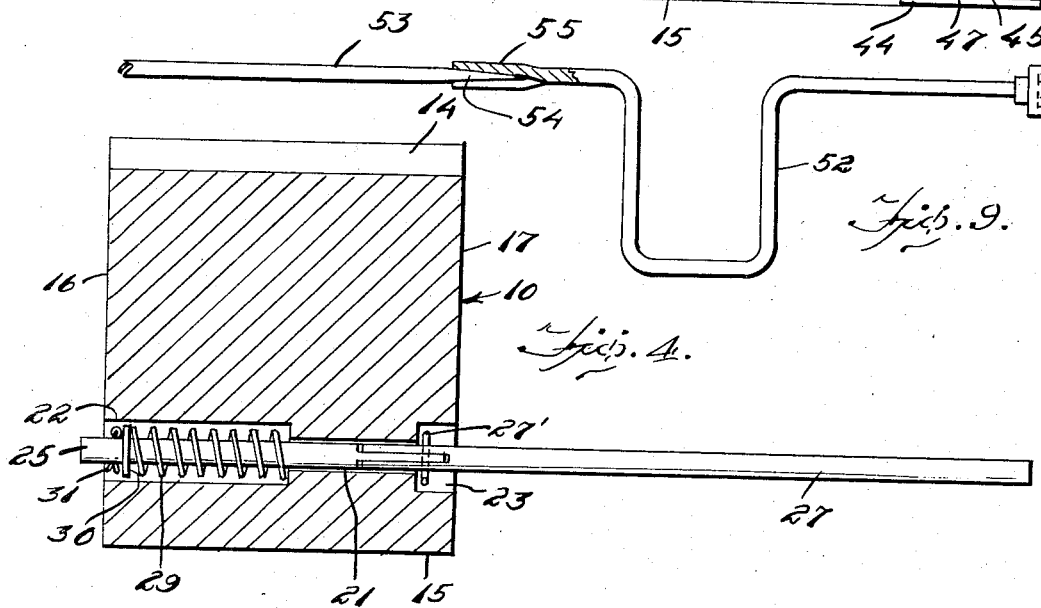
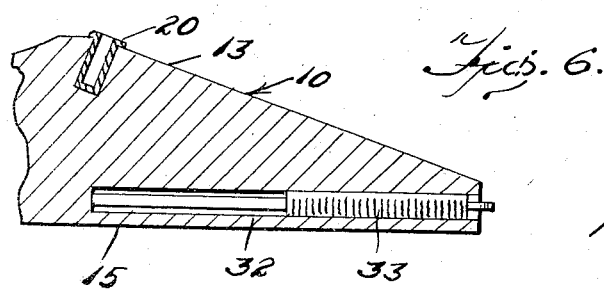
Inventor
Marthinus Jensen
By Clarence A. O'Brien
Attorney Patented Aug. 26, 1941

2,254,149

UNITED STATES PATENT OFFICE 2,254,149

AUTOMOBILE JACK

Marthinus Jensen, Greenwich, Conn.

Application September 28, 1940, Serial No. 358,913

5 Claims. (Cl. 254—88)

This invention relates to new and useful improvements in automobile jacks.

The primary object of the invention is to provide a device of this character which will minimize the amount of work required when jacking up a wheel supporting axle on an automobile when it is necessary or desired.

Another object of the invention is to provide means for supporting a flashlight or the like when operating the jack at night.

Another object of the invention is to provide means for supporting a warning signal.

Other objects of the invention are to provide a device of the aforementioned character which will be strong, durable, highly efficient and reliable in use, and which may be manufactured at comparatively low cost.

Still further objects and advantages of the invention will become apparent from a study of the following detailed description, taken in connection with the accompanying drawings, wherein like characters of reference designate corresponding parts, through the several views, wherein:

Figure 1 is a rear elevational view of my invention shown in supporting position beneath an automobile wheel and axle.

Figure 2 is a top plan view of the invention.

Figure 3 is a vertical transverse sectional view taken substantially on the line 3—3 of Figure 2.

Figure 4 is a vertical transverse sectional view of the cradle showing one jack guide rod in extended position.

Figure 5 is a fragmentary vertical transverse sectional view of the cradle.

Figure 6 is a fragmentary longitudinal vertical section of the cradle.

Figure 7 is a fragmentary rear elevational view of the cradle.

Figure 8 is a side elevational view of the flashlight holder shown partly in section.

Figure 9 is a fragmentary sectional view of the jack operating handle.

Referring now to the drawings in detail, it will be seen that the reference numeral 10 designates a cradle, constructed of suitable material, upon which the automobile wheel 11 is driven. The cradle 10 is constructed to provide inclined surfaces 12 and 13 and an intermediate grooved surface 14 on its top side while its bottom side 15 is straight and its front side 16 and back side 17 are substantially flat and parallel. Holes are formed in the cradle 10 in which are mounted receptacles 18, 19 and 20. Bores 21 are formed in the cradle 10 intermediate its ends, and near the bottom thereof, each of which terminates in a counter bore 22 in one side of the cradle 10 while the other ends of the bores terminate in the sides of grooves 23 and 24 in the other side of the cradle 10.

Rods 25 and 26 are slidably mounted in the bores 21 and have pivotally connected thereto arms 27 and 28 by pins 27' at one end portion while the other end portion of each has mounted thereon a compressible coil spring 29 which is mounted in a counter bore 22 in the cradle 10. Each spring 29 rests against the end of a counter bore 22 at one end portion and is engaged at its other end portion with a washer 30 which is secured on the rod by a cotter pin or the like 31.

The cradle 10 further has a bore 32 therein in which is housed a signal flag 33.

A flashlight holder 34 provided with a shank 35 is adapted to be inserted into one of the receptacles 18, 19, 20 with the flashlight 36 held in clamped position between the arms 37 and 38 which are mounted on one end of the shank 35 as shown in Figure 2. The ends of the arms 37 and 38 are provided with rollers 39 and 40 which are mounted on pins 41 and 42 in the ends of the arms 37 and 38.

A screw jack 43 operated in conjunction with the cradle 10 is provided with a flanged bottom 44 from which extends uprights 45 the top end portions of which are formed to provide tubular guides 46 which engage on the arms 27 and 28 to hold the jack 43 in the correct position relative to the cradle 10. When placed in adjusted position on the arms 27 and 28 the jack 43 is held in position by a set screw 47.

The screw jack 43 is operated by a handle 48 which is engaged with the jack 43 by extending through an opening 49 in the cradle 10 and engaging the jack at the handle receiving socketed member 50 or by engagement with the handle receiving socketed member 51.

The handle 48 is constructed in sections to provide a wrench 52 for removing the wheel while the section 53 of the handle is tapered as at 54 to provide a hub cap removing tool. The wrench section 52 is provided with a socket 55 for receiving the tapered end 54 of the section 53 to complete the jack handle 48 as shown in Figure 9 of the drawings.

The device is operated as follows:

The cradle 10 is placed in front of the wheel 11 with the jack 43 in position on the arms 27 and 28. After positioning the cradle 10 and jack 43 the automobile is then moved to cause the wheel 11 to travel up one of the two inclined surfaces 12 or 13 and come to rest at the grooved top side of the cradle 14. When the wheel 11 is in this position the jack handle 48 is inserted in the bore 49 and engaged at one end with the socketed member 50 of the jack 43. The jack 43 is then operated to engage the wheel supporting axle and lift the wheel 11 clear of the cradle 10. The cradle 10 and handle 48 are then removed from beneath the wheel 11 at which time the wheel 11 may be removed and replaced. Upon the lowering of the wheel and axle the jack handle 48 is inserted in the socketed member 51 which extends either forwardly or rearwardly of the automobile thus, permitting the wheel 11 to be lowered to the ground.

When the cradle 10 is removed from beneath the wheel 11 it may be used to support the flag 33 as a signal to motorists in the daytime or to support the flashlight at night.

Although I have shown and described herein a preferred embodiment of my invention, it is to be definitely understood that I do not desire to limit the application of the invention thereto, and any change or changes may be made in the structure and arrangement of the several parts, within the spirit of the invention as claimed.

What is claimed is:

1. In a device of the character described an automobile jack including a cradle having bores therein, rods slidably mounted in said bores, arms pivotally secured to said rods and a jack removably mounted on said arms.

2. In a device of the character described, a cradle having transverse bores and counter bores therein, rods mounted in said bores and counter bores, springs about said rods in said counter bores, arms pivotally secured to said rods and engaged in said bores, a jack engaged on said arms, and means for operating said jack.

3. In a device of the character described, a cradle having inclined end portions and a substantially flat bottom side, and further having transverse bores and counter bores therein, rods mounted in said bores and counter bores, resilient means about said rods in said counter bores for urging said rods outwardly of said bores and counter bores, arms pivotally secured to said rods and held engaged in said bores by said resilient means, a jack engaged on said arms, and means extending through said cradle for operating said jack.

4. In a device of the character described an automobile jack including a cradle having bores therein, rods slidably mounted in said bores, arms pivotally secured to and extending axially from said rods, means for holding said arms in extended position and a jack slidably engageable on said arms.

5. In a device of the character described, a cradle having transverse bores and counter bores therein and further having grooves in one side thereof, rods mounted in said bores and counter bores, arms pivotally secured to said rods and seated in said grooves, and resilient means about said rods in said counter bores for holding said arms seated in said grooves.

MARTHINUS JENSEN.